No. 795,307. PATENTED JULY 25, 1905.
G. T. REED.
RUBBER TIRE FASTENER FOR WHEELS.
APPLICATION FILED OCT. 5, 1904.
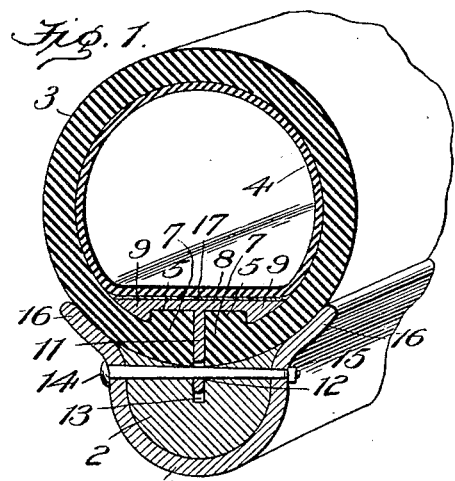
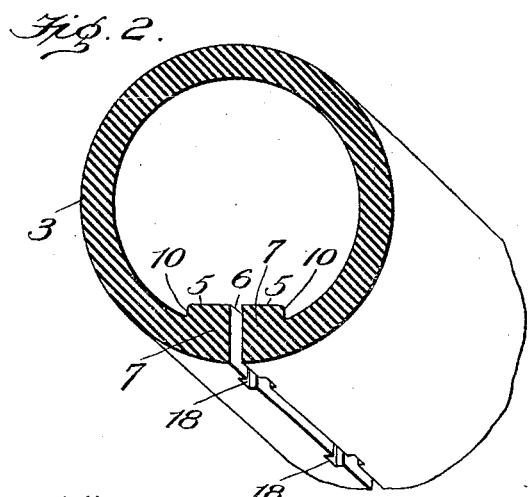
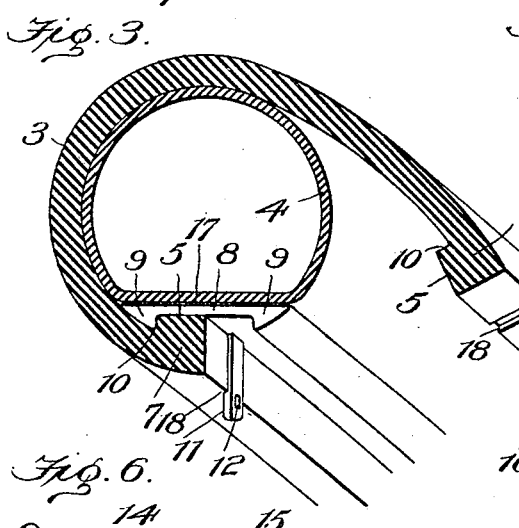
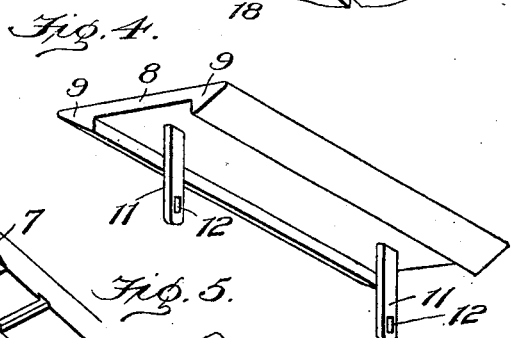
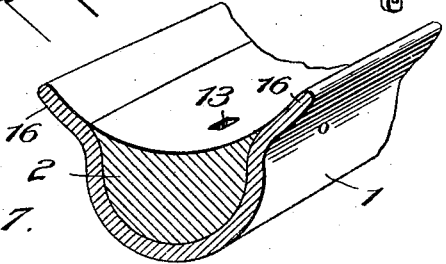
Witnesses
Edwin L. Bradford
Anne B. Johnson
Inventor
George T. Reed
by
Johnson & Johnson
Attorneys

UNITED STATES PATENT OFFICE.

GEORGE THORN REED, OF BALTIMORE, MARYLAND, ASSIGNOR OF ONE-THIRD TO ALBERT H. BEIMSCHLA, OF BALTIMORE, MARYLAND.

RUBBER-TIRE FASTENER FOR WHEELS.

No. 795,307.  Specification of Letters Patent.  Patented July 25, 1905.

Application filed October 5, 1904. Serial No. 227,177.

*To all whom it may concern:*

Be it known that I, GEORGE THORN REED, a citizen of the United States, residing at Baltimore, State of Maryland, have invented certain new and useful Improvements in Rubber-Tire Fasteners for Wheels; and I do hereby declare the following to be a full, clear, and exact description of the invention, such as will enable others skilled in the art to which it appertains to make and use the same.

The invention which forms the subject of this patent resides in certain novel parts and combinations of parts whereby rubber tires are supported and fastened upon the rims of bicycle and automobile wheels, and includes a novel construction of rubber tire whereby it is made secure in its seating, the object being to render it convenient and easy to apply and remove the tire from the wheel and to safely secure it both radially and laterally in fixing the parts together and to the wheel-rim.

The accompanying drawings illustrate my invention in the form in which I prefer to employ it; but it will be understood that my invention is not limited to the precise form and construction herein shown and described, as changes may be made without exceeding the scope of the invention or the claims in which it is set out.

Referring to the drawings, Figure 1 shows in cross-section the rubber tire, the wheel-rim, and the means for connecting them embodying my invention, a portion of the parts being extended in perspective. Fig. 2 shows the tire in cross-section, a portion being extended in perspective looking at the split base. Fig. 3 shows the tire and its binder-plate in cross-section, a portion of the parts being extended in perspective looking at the split base and illustrating the manner of inserting the binder-plates and the air-tube into the tire. Fig. 4 shows one of the binder-plates and its fastening-lugs looking at its under side. Fig. 5 shows in cross-section and in perspective the wheel-rim comprising a semicircular hollow metal rim inclosing a bed-rim forming the seat for the tire. Fig. 6 shows one of the tapering or wedge-shaped bolts for fastening the binder-lugs to the wheel-rim. Fig. 7 is a sectional view taken through a portion of the circle of the wheel, showing the fastenings for the tire.

The wheel-rim comprises a hollow metal rim 1, preferably of semicircular form, and a solid wood core or bed 2, fitted within the metal rim. The solid wood core or bed has its periphery concave and forms the support and seating for the tire, while the metal rim is extended on each side and forms a continuation of the concave periphery of the wood tire-bed, thereby increasing the seating capacity for the tire and affording it ample lateral support in its seat against causes tending to its displacement. The construction of the wheel-rim, therefore, affords the required strength and a safe housing for the tire. The rubber tire 3 is an unbroken circle of the pneumatic type, having the usual inner air-tube 4 and provision for its inflation. The tire is formed with an interior transverse flat wall 5, which is intersected by a radial slit 6 and forms a thick body 7 to the split parts. The metal rim is preferably an unbroken circle; but the wood core or bed is of two or more sections fitted into the ring-rim. A binder 8, formed of plate-sections abutting at their ends and seated upon the split tire-base parts, serves as the means for locking the split tire parts together, the means for fastening the tire to the wheel-rim, and as a seating for the air-tube. These binder-plates extend equally across the tire split and their edges preferably form shoulders 9 9, adapted to engage shoulders 10 formed in the flat base, preventing thereby lateral slipping of the binder-plates, which might endanger cutting the tire, and for the same purpose the plate-shoulders terminate in curves conforming to the circular walls of the tire. Mediately of the width of each binder-plate section it is provided with one or more lugs 11, which may be riveted or brazed and are preferably of flat cross-section of a length sufficient to project through the tire split and into the wood core or bed of the wheel-rim. These lugs are provided at their ends each with an eye or perforation 12, so that all the lugs in the circle of the tire project radially into recesses 13 in the surface of the tire core or bed, and which recesses are made to register with the apertures in all the lugs at the seating-wall of the tire. The tire being seated upon the wheel-rim with its lugs projecting through the split, the lugs are then secured to the wheel-rim by bolts 14 driven through transverse holes or bores in the metal and wood rims of the wheel and through the apertures of the lugs and secured by nuts 15 at the opposite side of the rim, and thereby hold the binder-plates and the tire firmly upon the wheel-rim. To give the bolts a function of drawing the binder-plates inward with a clamping action upon the flat wall of the tire and the convex wall of the tire upon the bed of the wheel-rim, I make the bolts tapering or wedge shape from their heads, so that in driving them into engagement with the binder-lugs they will have a drawing or pulling action on the lugs. It will be noticed that the shoulders 9 of the binder-plates embrace the shoulders 10 of the split parts of the tire-base and anchor or prevent their separation under sidewise strain, while the sides of the metallic rim, embracing the outer sides 16 of the tire, reinforce the binding and holding action of the binder-plates and keep the tire safe against sidewise lunging of the wheel. To facilitate the engagement of the bolts with the apertures of the lugs, the apertures are oblong, and as the bores in the rim are preferably made to allow the bolts to contact with the wall of the tire the pulling action of the bolts will be resisted by the tire as well as by the metallic rim. As the air-tube rests upon the binder-plates, it would be liable to become abraded, and the binder-plates are covered with canvas or felt 17, secured by cement or otherwise, to protect the air-tube from injury.

As seen in Fig. 2, the split walls of the tire are formed with recesses 18, registering with the binder-lugs, so that in securing the tire its split walls are practically closed tight. In applying the binder-plates one side of the split tire-base is pulled open and the binder-plates seated upon the flat wall of the tire in end-abutting relation to each other and with the fastening-lugs projecting through the split as in Fig. 3. The air-tube is then laid on the binder-plate and the tire is then closed and secured to the wheel-rim as stated.

The shoulders of the binder-plates can be separately secured thereon or turned the desired shape on the plate to form the locking engagement with the split tire parts. It is important to note that the bolts which secure the tire to the wheel-rim serve also in driving the nuts hard upon the bolts to clamp the flaring sides of the metallic rim firmly against the sides of the wood bed and against the walls of the tire.

I claim—

1. A tubular rubber tire for wheels having its base split longitudinally its inner circular wall flat transversely on each side of said split forming thereby a thick base, in combination with binder-plates seated upon the flat tire-wall and having lugs projecting through said tire split, each lug having an aperture a wheel-rim forming a support and housing-seat for the tire, and nutted bolts passing through the wheel-rim and into and through the apertures in said lugs, whereby to secure the tire to the wheel-rim.

2. A tubular tire for wheels having its base split longitudinally, its inner circular wall flat transversely on each side of said split forming thereby a thick base, and having shoulders on each of and parallel with the split, in combination with binder-plates seated upon said flat tire-seat and having shoulders adapted to engage the shoulders of said flat seat, lugs projecting from said binder-plate through said tire split a wheel-rim forming a support and housing-seat for said tire, and nutted bolts passing transversely through the wheel-rim and engaging the said lugs, whereby the split parts of the tire are locked together laterally.

3. A tubular rubber tire for wheels having its base split longitudinally, the circle of its inner wall interrupted by a flat transverse seat on each side of said split and forming shoulders in combination with binder-plates seated upon said flat seat and having shoulders adapted to engage the shoulders of said flat seat, lugs projecting from said binder-plate through said tire split and having apertures, a wheel-rim forming a support and housing-seat for said tire, and nutted bolts tapering from the head passing transversely through the wheel-rim and into and through the apertures in said lugs whereby the binder-lugs are drawn inward by the wedge action of the bolts in driving them to clamp and to secure the tire to the rim.

4. A tubular rubber tire for wheels having its base split longitudinally, in combination with binder-plates seated upon the inner wall of the tire and having lugs projecting through said split, a wheel-rim forming a support and housing for the tire, and means secured in said wheel-rim engaging said lugs for securing the tire to the wheel-rim.

5. In combination with a pneumatic tire comprising an external rubber tube and an internal air-tube, a wheel-rim forming a seating and housing for said tire, binder-plates seated on the inner wall of the outer tube, provided with a cushion-seating for the air-tube and having lugs projecting through said split, and means secured to said wheel-rim engaging said lugs.

6. In combination with a pneumatic tire, a metallic wheel-rim formed of a semicircle in cross-section each side whereof terminating in a flaring seat, a solid bed within the semicircle of said rim forming a seating for the tire conforming to the seating of said flaring sides, whereby the tire is supported on the flaring sides of the rim, and means for securing the tire upon its seating.

7. A tubular rubber tire having its base split longitudinally, in combination with binder-plates within the tire having lugs passing through said split, the edges of said binder-plates forming dogs engaging the inner walls of the tire, a wheel-rim, and means passing transversely through said rim and through said lugs for securing the parts together.

8. A pneumatic tire split longitudinally, binder-plates seated on its inner wall for engaging and locking the split parts together, a wheel-rim forming a seating and housing for the tire, lugs projecting from the binder-plates and entering the wheel-rim, and means for engaging the lugs and the rim at right angles thereto for securing the tire to the rim.

In testimony whereof I have signed my name to this specification in the presence of two subscribing witnesses.

GEORGE THORN REED.

Witnesses:
J. HENRY CONWAY,
BERNARD A. SCHMITZ.